Nov. 2, 1965     L. L. STRYDOM     3,215,370
ROTATING WING AIRCRAFT
Filed Feb. 19, 1964     2 Sheets-Sheet 1
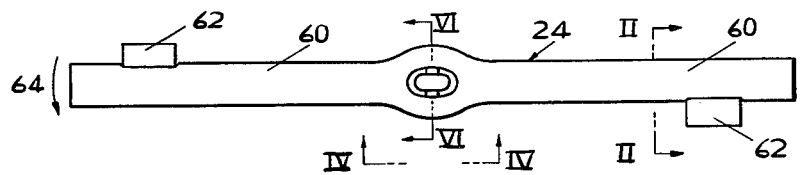
FIG. 1
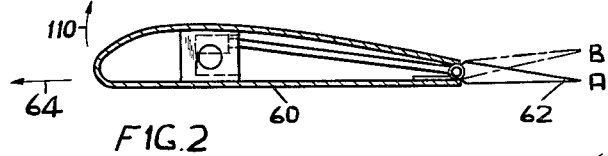
FIG. 2
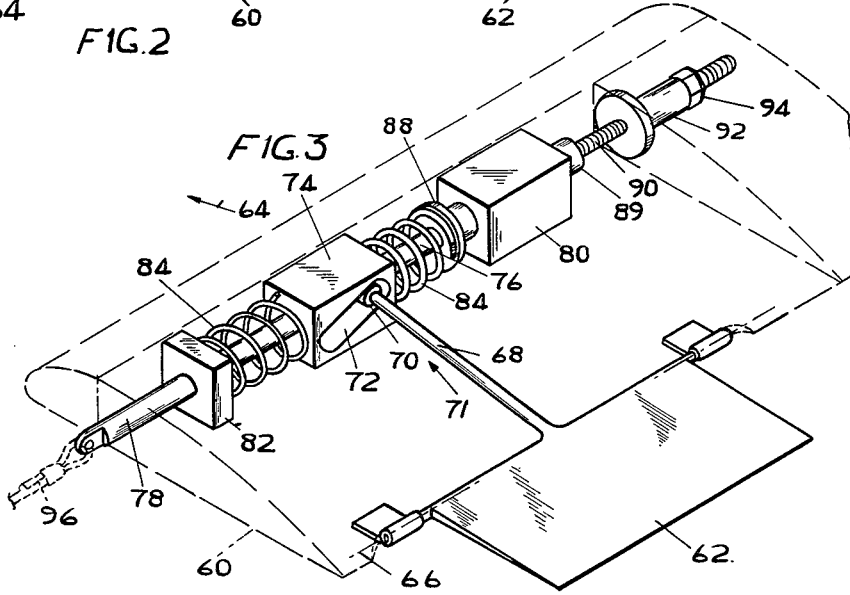
FIG. 3
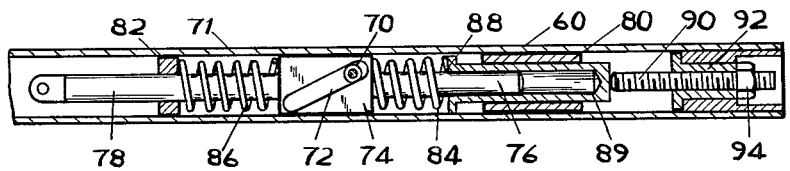
FIG. 5
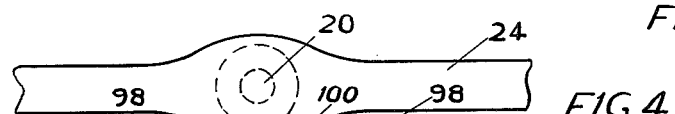
FIG. 4
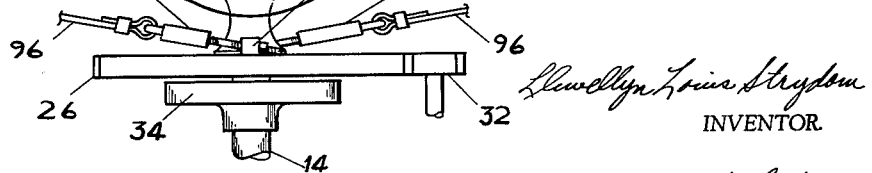
Llewellyn Louis Strydom
INVENTOR.
BY Wenderoth, Lind and Ponack,
attorneys Nov. 2, 1965     L. L. STRYDOM     3,215,370
ROTATING WING AIRCRAFT
Filed Feb. 19, 1964     2 Sheets-Sheet 2
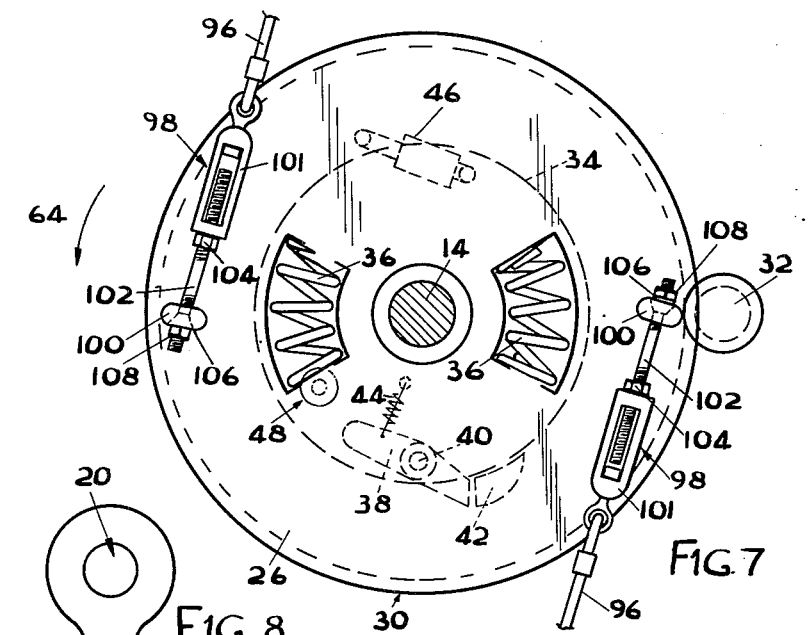
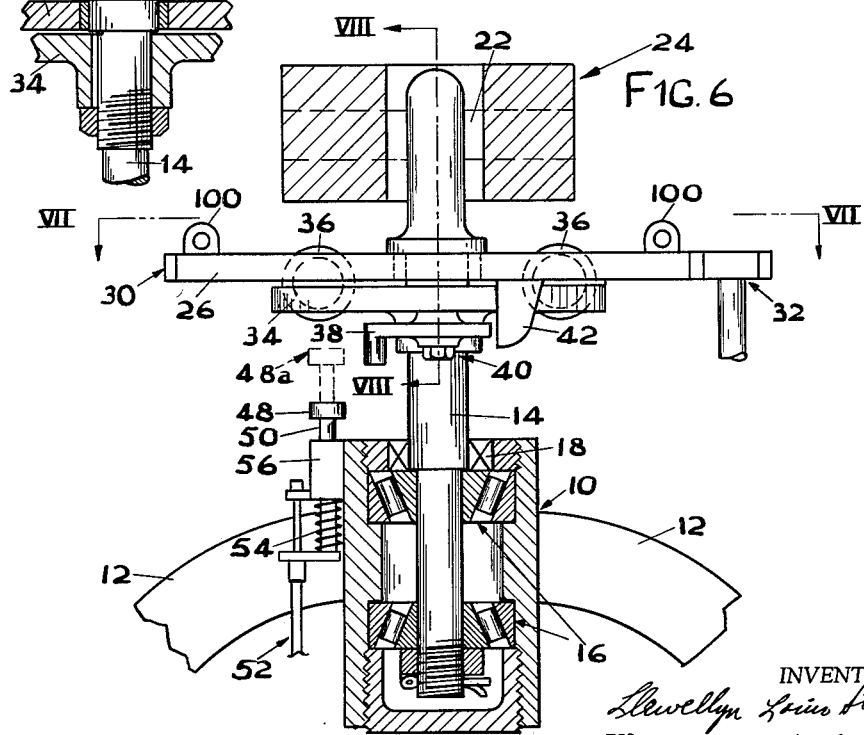
INVENTOR.
Llewellyn Louis Strydom
BY Wenderoth, Lind
and Ponack,
attorneys United States Patent Office 3,215,370
Patented Nov. 2, 1965

3,215,370
ROTATING WING AIRCRAFT
Llewellyn Louis Strydom, Worcester, Cape Province, Republic of South Africa, assignor to Rotorcraft S.A. (Proprietary) Limited, Cape Town, Cape Province, Republic of South Africa
Filed Feb. 19, 1964, Ser. No. 345,978
Claims priority, application Republic of South Africa, Feb. 26, 1963, 807/63
6 Claims. (Cl. 244—17.11)

This invention relates to rotating wing aircraft having rotor wings. It relates in particular to aircraft having a rotor wing which is mounted to be freely rotatable in flight to provide support to the aircraft, and in which propulsion means for forward propulsion such as one or more engines driving a propellor or airscrew are provided, together with means for providing an initial rotation to the rotor wings to assist in take-off.

According to the invention, a rotating wing aircraft has at least one rotor wing mounted for rotation about an upwardly directed axis, drive means to rotate the rotor wing, lift control means for maintaining the lift of the rotor wing in the no-lift condition while the rotor wing is being driven, clutch means to disconnect the drive to the rotor wing, and operating means to operate the lift control means, whereby the lift of the rotor wing increases automatically under the action of centrifugal force when the clutch means has been disconnected.

The rotor wing may comprise a central hub, and a plurality of resilient blades extending outwardly from the central hub. The lift control means may include a trim tab at or near the end of each blade and mounted on the trailing edge of the blade to be pivotally displaceable about an axis substantially radial to the hub and to the rotor wing rotational axis, and may include also, displacing means for each trim tab responsive to centrifugal force as a result of the rotation of the rotor wing about its axis when the rotor wing rotates, for displacing the trim tab pivotally about its pivotal axis.

The displacing means may include a cam member having a cam face, and bias means urging the cam member to an initial position. Each trim tab may have a leading arm and a follower on the arm to co-operate with the cam face, the arrangement being such that in the initial position of the cam member the trim tab is in the position corresponding to the no-lift condition of the rotor wing.

The drive means to the rotor wing, may include a drive flange coaxial with the rotational axis and arcuately displaceable to a limited extent about the rotational axis relative to the rotor wing. The lift control means may include lock means to lock the several cam members in their initial positions, the lock means comprising tensile elements connected to the cam members and extending inwardly toward the hub and connected to the drive flange eccentrically to the rotational axis. A releasable catch may be provided, to hold the drive flange in a forward position relative to the rotor wing, the forward position of the flange corresponding to the initial positions of the cam members.

The operating means may include catch release means to release the catch after the clutch means has disconnected the drive to the rotor wing after it has been driven to speed. Centrifugal force acting on the cam members due to rotation of the rotor wing about its axis, will cause the cam members to be dipslaced outwardly away from the rotational axis against the action of the bias means, thereby causing the cam faces to coact with the followers on the arms, and thereby displacing the arms downwardly relative to the rotor wing and causing the trim tabs to be tilted up about their pivotal axes relative to the blades, and thereby twisting the blades to have an increased angle of attack and thereby providing lift. The catch release means may be inter-connected with the throttle control of the aircraft propeller motor, and with the brake control on the wheels of the aircraft, whereby opening of the throttle beyond a predetermined extent, causes the catch release means to operate to release the catch and the brakes. The clutch means, the release roller, the wheel brake for the aircraft, and the throttle to the propeller motor may all be interconnected, so that an operation of the throttle to the full open position, will simultaneously cause the wheel brakes to come off, the clutch means to disengage and the catch release means to operate.

Bias adjustment means may be provided to adjust the initial bias of the bias means, and tensile element adjustment means may also be provided, to adjust the lengths of the tensile elements and hence the positions of the cam members and thier cam faces relative to the arms.

Furthermore, the drive means may include a resilient connection and damping means between the drive flange and the rotor wing. The drive means may include a drive pinion and the clutch means, may be a Bendix-type drive or any other suitable clutch or coupling, for example a friction disc or cone clutch.

The releasable catch, may be a pawl pivotally mounted on a flange fast with the rotor shaft, and adapted to cooperate with a lug projecting from the drive flange, the pawl being biased into the engaged position by a spring. The catch release means, may comprise a release roller, axially displaceable into and out of the operative condition, for co-operating with the trailing end of the pawl, to bring it out of engagement with the projecting lug. The release roller may be biased towards the inoperative position, by means of a spring, and it may be operable by a cable connection, which as mentioned above may be interconnected with the throttle control, of the propeller motor of the aircraft.

Further features of the invention will become apparent from the following description with reference to the accompanying drawings, which are given by way of example only.

In the drawings:
FIGURE 1 shows diagrammatically a plan view of a rotor wing of an aircraft in accordance with the invention;
FIGURE 2 shows a detail sectional end elevation to a larger scale, at II—II in FIGURE 1;
FIGURE 3 shows a three-dimensional view of a trim tab and its co-operating cam member in relation to the rotor wing;
FIGURE 4 shows a detail side elevation at IV—IV in FIGURE 1 but to a larger scale;
FIGURE 5 shows a longitudinal sectional elevation of cam member;
FIGURE 6 shows a sectional elevation at VI—VI in FIGURE 1, but to a larger scale;
FIGURE 7 shows a plan view at VII—VII in FIGURE 6; and
FIGURE 8 shows a fragmentary detail in sectional side elevation at VIII—VIII in FIGURE 6, of the mounting of the drive flange on the rotor shaft.

Referring to FIGURES 6 to 8 of the drawings, reference numeral 10 refers to a bearing box, having arms 12, connected to the airframe of the aircraft or which is otherwise suitably mounted on the airframe. The rotor wing shaft 14 is mounted on taper roller bearings 16 housed within the box 10, the taper roller shaft projecting upwardly out of the box, through a seal 18. The rotor wing shaft 14 is provided with an eye 20 at its upper end, the eye 20 holding a pin 22, on which is pivotally mounted see-saw rotor wing 24. Drive means including drive flange 26, is mounted on bush 28, coaxially with the rotor wing shaft 14. The drive flange 26 has teeth meshing with the teeth of drive pinion 32, connected via clutch means such as a friction disc or cone clutch, or Bendix-type drive (not shown), to the propeller motor. The rotor wing shaft 14, has fast with it a torsion flange 34 which is resiliently connected to the drive flange 26 via springs 36. These springs 36 permit the arcuate displacement of the drive flange 26 relative to the torsion flange 34, by an amount of about 10 degrees. A releasable catch in the form of a pawl 38 is provided, mounted to pivot about the axis of pin 40 mounted on flange 34, and adapted to engage with a downwardly projecting lug 42 fast with the drive flange 26. The pawl 38 is biassed into the engaged position with the downwardly projecting lug 42, by means of spring 44 attached to the torsion flange 34. The pawl 38, is releasable by catch-release means, to be described more fully hereafter. In addition to the resilient connection between the drive flange 26 and the torsion flange 34, provided by the springs 36, there is provided damping means, including a plunger and cylinder assembly 46, connected to the drive flange 36 and to the torsion flange 34.

The catch release means, adapted to release the pawl 38, comprises a release roller 48, which is rotatably mounted on spindle 50, and which is upwardly displaceable into the operative position 48a (see FIGURE 6) by means of cable 52, against the action of spring 54. The spindle 50 is guided for linear movement by bush 56, fast with the bearing box 10. The cable 52, is interconnected with the throttle control of the prime mover driving the propellor of the aircraft.

Referring now to FIGURES 1 to 5 of the drawings, the rotor wing is shown having two oppositely extending blades 60 of aerofoil section, and having lift control means including trim tabs 62 at the trailing edges of the blades, the direction of rotation of the rotor wing, being in the direction of arrow 64. The trim tabs 62, are pivotally mounted at or near the ends of the blades 60 about longitudinal axes 66. Each trim tab has a leading arm 68, having a roller 70 at its leading end, adapted to co-operate with displacing means 71 and comprising a cam member 74 having a cam face 72 and oppositely projecting shafts 76 and 78 guided for longitudinal linear movement by means of guide bushes 80 and 82 which are mounted in the blade 60 of the rotor wing. The cam member 74 is biassed towards an initial position shown in FIGURES 3 and 5 of the drawings, by means of bias means in the form of springs 84 and 86, the spring 84 being stiffer than the spring 86. The spring 84, abuts at one end against the flange 88 of an adjustment bush 89 which is axially slidable in the guide bush 80. The position of adjustment bush 89 is adjustable by means of adjusting screw 90, co-operating with threaded bush 92 mounted in the end of the wing, and co-operating with lock nut 94, to lock the adjusting screw 90 in position relative to the blade 60. The initial compression of the spring 84, and hence the pressure which it exerts on the cam member 74, is adjustable by means of the adjusting screw 90.

The shaft 78, at the inner end of the cam member 74 is connected via a flexible element 96 passing along the wing, via adjustment means 98 to lugs 100 fast with the drive flange 26. The adjustment means 98, comprises a stirrup member 101, threaded to receive a threaded shank 102, and having a co-operating lock nut 104. Each lug 100 has a spherical seat, within which it is adapted to seat a nut 106, having a spherical seat. A lock-nut 108 is adapted to lock the nut 106 in position on the threaded shank 102.

In operation, power is applied to the pinion 32 from the prime mover driving the propeller of the aircraft (or from an independent prime mover), and the drive flange is driven in the direction of arrow 64. Due to the inertia of the rotor wing 24, the springs 36 are compressed, and the drive flange 26, is displaced arcuately relative to the torsion flange 34, by an amount of about 10 degrees. As a result of such arcuate displacement into the forward position, relative to the torsion flange 34, the lug 42 passes past the pawl 38, which then prevents the return of the drive flange 26 to its inoperative position relative to the torsion flange 34, until such time as the pawl has been released.

The arcuate displacement of the drive flange 26 into the forward position relative to the torsion flange 34, causes the cam members 74 to be displaced by means of the flexible elements 96, into the inward position shown in FIGURES 3 and 5 of the drawings. These positions of the cam members 74, correspond to the down positions A of the trim tabs 62, as shown in FIGURE 2 of the drawings. This also corresponds to the no-lift condition of the rotor wing.

The rotor wing is speeded up, and when it has sufficient kinetic energy, the drive to the pinion 32 is disengaged by means of clutch means (not shown) and the rotor wing then rotates freely. Thereupon the pilot opens the throttle to the engine driving the propeller, and by means of the inter-connection of the release roller 48, to the throttle, brings the release roller 48 into the operative position 48a (see FIGURE 6), in which position it engages with the trailing end of the pawl 38, and releases the pawl from engagement with the lug 42.

As a result of the rotation of the rotor wing, centrifugal force acting on the cam members 74 exerts a couple on the drive flange 26, which displaces it in a direction relative to the torsion flange 34, opposite to that of arrow 64.

The centrifugal force displaces the cam members 74 outwardly, and this displacement is resisted by the springs 84. The cam members 74 (and the cam faces 72) in being displaced outwardly under the action of centrifugal force, cause the rollers 70 to roll down the cam faces 72, thus causing the trim tabs to pivot about their pivotal axes 66, and causing them to be displaced upwardly into the positions B shown in FIGURE 2 of the drawings. Such upward displacement of the trim tabs 62, while the rotor wing is rotating, causes the blades 60 to be resiliently twisted about longitudinal axes, in the direction of arrow 110, into a positive angle of attack, thereby causing the rotor wing to have lift. This invention makes use of the inherent resilience of the rotor wing 24, to cause it to twist about a longitudinal axis, into a positive angle of attack.

As the rotational speed of the rotor decreases due to the absorption of kinetic energy for take-off, the centrifugal force on cam members 74 decreases, and the cam members 74 move inwardly towards the rotational axis, under the action of springs 84, until the rotor has passed into auto-rotation and stable auto-rotational r.p.m. has been attained.

During steep turns, or when landing "flare outs" are performed, or when any other manoeuvre is executed during which the rotor speed increases, the increasing centrifugal force on the cam members 74, again displaces the cam members 74 outwardly away from the rotational axis, thereby causing the trim tabs 62 to be displaced towards the position B, and thereby again causing the blades 60 to be twisted into a positive angle of attack, to provide increased lift.

It is an advantage of this invention, that by driving the rotor wing up to speed initially, while the aircraft is still stationary, a very much shorter run or no run at all is necessary for take-off.

By way of explanation, it is the aerodynamic forces acting on the trim tabs when they are in their raised positions, and when the rotor wing rotates, which causes the blades of the rotor wing to be resiliently twisted to have a positive angle of attack.

I claim:
1. A rotating wing aircraft which includes
   (a) at least one rotor wing mounted for rotation about an upwardly directed axis and comprising a central hub and a plurality of resilient blades extending outwardly from the central hub;
(b) drive means to rotate the rotor wing;
(c) lift control means for maintaining the lift of the rotor in the no-lift condition while the rotor wing is driven and comprising
  (i) a trim tab at or near the end of each blade and mounted on the trailing edge of the blade to be pivotally displaceable about an axis substantially radial to the hub and to the wing rotational axis, and
  (ii) displacing means for each trim tab responsive to centrifugal force as a result of rotation of the rotor wing about its axis for displacing the trim tab pivotally about its pivotal axis, and including a cam member having a cam face, and including bias means urging the cam member to an initial position;
  the trim tab having a leading arm and a follower on the arm to co-operate with the cam face, the arrangement being such that in the initial position of the cam member, the trim tab is in the position corresponding to the no-lift condition of the rotor wing;
(d) clutch means to disconnect the drive to the rotor wing; and
(e) operating means to operate the lift control means whereby the lift of the rotor wing increases automatically under the action of centrifugal force when the clutch means has been disconnected.

2. An aircraft according to claim 1, in which the drive means includes a drive flange coaxial with the rotational axis and arcuately displaceable to a limited extent about the rotational axis relative to the rotor wing, and in which the lift control means include lock means to lock the several cam members in their initial positions and comprising tensile elements connected to the cam members and extending inwardly toward the hub and connected to the drive flange eccentrically to the rotational axis, and a releasable catch to hold the drive flange in a forward position relative to the rotor wing, the forward position of the flange corresponding to the initial positions of the cam members.

3. An aircraft according to claim 2, in which the operating means include catch release means to release the catch after the clutch means has disconnected the drive to the rotor wing after it has been driven up to speed, whereby centrifugal force acting on the cam members due to rotation of the rotor wing about its axis causes the cam members to be displaced outwardly away from the rotational axis against the action of the bias means, thereby causing the cam faces to co-act with the followers on the arms and thereby displacing the arms downwardly relative to the rotor wing and causing the trim tabs to be tilted up about their pivotal axes relative to the blades and thereby twisting the blades to have an increased angle of attack and thereby providing lift.

4. An aircraft according to claim 3, and having wheels and brakes for the wheels, in which the catch release means is interconnected with the throttle control of the aircraft propeller motor and with the brake control on the wheels of the aircraft; whereby opening of the throttle beyond a predetermined extent causes the catch release means to operate to release the catch and the brakes.

5. An aircraft according to claim 2, in which bias adjustment means are provided to adjust the initial bias of the bias means and in which tensile element adjustment means are provided to adjust the lengths of the tensile elements and hence the positions of the cam members and their cam faces relative to the arms.

6. An aircraft according to claim 2, in which there are provided a resilient connection and damping means between the drive flange and the rotor wing.

References Cited by the Examiner
UNITED STATES PATENTS

| | | | |
|---|---|---|---|
| 2,324,588 | 7/43 | Larsen | 244—17.13 |
| 2,380,581 | 7/45 | Prewitt | 244—17.13 |
| 2,421,364 | 5/47 | Cierva | 244—17.13 |
| 2,443,393 | 6/48 | Landgraf | 170—160.25 |
| 2,485,543 | 10/49 | Andreau. | |
| 2,695,674 | 11/54 | Kaman | 244—17.11 X |
| 2,998,850 | 9/61 | Armstrong | 170—160.16 |

MILTON BUCHLER, *Primary Examiner.*

FERGUS S. MIDDLETON, *Examiner.*